United States Patent
Hoshino (10) Patent No.: US 11,973,884 B2
(45) Date of Patent: Apr. 30, 2024

(54) ANONYMOUS SIGNATURE SYSTEM, SIGNATURE GENERATION APPARATUS, ANONYMOUS SIGNATURE GENERATION APPARATUS, VERIFICATION APPARATUS, ANONYMOUS SIGNATURE METHOD AND PROGRAM

(71) Applicant: NIPPON TELEGRAPH AND TELEPHONE CORPORATION, Tokyo (JP)

(72) Inventor: Fumitaka Hoshino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 157 days.

(21) Appl. No.: 17/610,100

(22) PCT Filed: May 27, 2019

(86) PCT No.: PCT/JP2019/020875
§ 371 (c)(1),
(2) Date: Nov. 9, 2021

(87) PCT Pub. No.: WO2020/240654
PCT Pub. Date: Dec. 3, 2020

(65) Prior Publication Data
US 2022/0247574 A1    Aug. 4, 2022

(51) Int. Cl.
*H04L 9/32* (2006.01)

(52) U.S. Cl.
CPC .................. *H04L 9/3255* (2013.01)

(58) Field of Classification Search
CPC . H04L 2209/42; H04L 9/3073; H04L 9/3247; H04L 9/3255
See application file for complete search history.

(56) References Cited

U.S. PATENT DOCUMENTS

| | | | |
|---|---|---|---|
| 2006/0159259 A1* | 7/2006 | Gentry | H04L 9/0643 380/42 |
| 2011/0060903 A1* | 3/2011 | Yoshida | H04L 9/3218 713/155 |

(Continued)

FOREIGN PATENT DOCUMENTS

| | | | | |
|---|---|---|---|---|
| JP | 2003-067532 A | 3/2003 | | |
| WO | WO-2010013699 A1 * | 2/2010 | | H04L 9/3255 |
| WO | WO-2019235095 A1 * | 12/2019 | | |

OTHER PUBLICATIONS

Hoshino, Fumitaka, Tetsutaro Kobayashi, and Koutarou Suzuki. "Anonymizable signature and its construction from pairings." Pairing-Based Cryptography-Pairing 2010: 4th International Conference, Yamanaka Hot Spring, Japan, Dec. 2010. Proceedings 4. Springer Berlin Heidelberg, 2010. (Year: 2010).*

(Continued)

*Primary Examiner* — Michael Simitoski (57) ABSTRACT

An anonymous signature system in which a signature $\sigma$ is anonymized by an agent specified by a signer, includes computers each including a memory and a processor configured to, from a security parameter, generate a system parameter $\rho$ independent of the agent; from $\rho$, generate an agent secret key w and an agent public key $g_A$; from $\rho$, generate a secret key x and a public key y of the signer; from x, a message m on which $\sigma$ is to be put, and $g_A$, generate $\sigma$ to be put on m; from an identifier i of the signer, w, $\sigma$, a ring L representing a group to which the signer belongs, a list $y_L$ of public keys y of signers in L, and m, generate a ring signature $\sigma'$ by anonymizing $\sigma$; and from L, $y_L$, m, and $\sigma'$, output a verification result b form.

5 Claims, 8 Drawing Sheets

(56) References Cited

U.S. PATENT DOCUMENTS

| | | | | |
|---|---|---|---|---|
| 2011/0179269 A1* | 7/2011 | Furukawa | ............. | H04L 9/3255 |
| | | | | 713/156 |
| 2012/0159153 A1* | 6/2012 | Shim | .................... | H04L 9/0847 |
| | | | | 713/155 |
| 2014/0169556 A1* | 6/2014 | Yagisawa | ............. | H04L 9/0816 |
| | | | | 380/30 |
| 2014/0245019 A1* | 8/2014 | Hwang | .................. | G06F 21/64 |
| | | | | 713/176 |
| 2021/0150520 A1* | 5/2021 | Geraud | ............. | G06Q 20/3278 |

OTHER PUBLICATIONS

Hoshino, Fumitaka et al. "On an Application of a Variant of Trapdoor DDH Group", Oct. 2019. (Year: 2019).*

Tetsutaro Kobayashi (2019) "Designated Agent Anonymizable Signature", The Institute of Electronics, Information and Communication Engineers pp. 1-5 with English Machine Translation.

F. Hoshino (2014) "A Variant of Diffie-Hellman Problem and How to Prove Independency" SCIS The 31st Symposium on Cryptography and Information Security Kagoshima, Japan, with English Machine Translation.

\* cited by examiner

ANONYMOUS SIGNATURE SYSTEM, SIGNATURE GENERATION APPARATUS, ANONYMOUS SIGNATURE GENERATION APPARATUS, VERIFICATION APPARATUS, ANONYMOUS SIGNATURE METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/020875, filed on 27 May 2019, the disclosure of which is hereby incorporated herein by reference in its entirety.

TECHNICAL FIELD

The present invention relates to an anonymous signature system, a signature generation apparatus, an anonymous signature generation apparatus, a verification apparatus, an anonymous signature method, and a program.

BACKGROUND ART

Anonymous signature is known as a method for electronically signing while maintaining anonymity of a signer. Ring signature is known as one of schemes of such anonymous signature. In the ring signature, although a third party can verify that a signature is created by a member of a group, which member of the group has created the signature cannot be identified, and in addition, no group manager exists.

Anonymizable signature is known as an extension of the ring signature. In the anonymizable signature, anyone who comes into possession of a message on which a signature is put can later transform the signature into an anonymous signature. Accordingly, once a signer belonging to a group (ring) hands a message on which the signer puts a signature by using an own private key over to an agent (for example, a third party that keeps and manages signatures), the signer does not need to be involved in anonymization of the signature. In other words, the signature can be anonymized only by the agent.

Meanwhile, in the anonymizable signature, a signature handed over to an agent from a signer is an ordinary signature. For example, if an attacker obtains the signature due to leakage or the like, the attacker, similarly to the agent, can find that the signer has put the signature. To overcome such a problem, agent-specified anonymizable signature is known that makes anyone but a pre-specified agent unable to find a signer (see Non-Patent Literature 1). In the agent-specified anonymizable signature, a signer generates a private key and a public key by using a system parameter made public by a specified agent, and then puts a signature on a message by using the private key. Thus, signature verification and anonymization can be performed only by the agent, so that anyone but the agent cannot find the signer even if the signature is leaked.

CITATION LIST

Non-Patent Literature

Non-Patent Literature 1: Tetsutaro Kobayashi, Fumitaka Hoshino, "Agent-specified Anonymizable Signature", SCIS2019, 2019.

SUMMARY OF THE INVENTION

Technical Problem

However, in the agent-specified anonymizable signature, a signer needs to generate a public key by using a system parameter made public by a specified agent, as described above. Accordingly, for example, when the signer desires to specify another agent after a public key is generated, the signer needs to regenerate a public key by using a system parameter made public by the other agent. In other words, each time the specified agent is changed, a signer spends time and effort in regenerating a public key.

An embodiment of the present invention has been made in view of the above-described respects, and an object thereof is to reduce time and effort in key generation following a change of specified agent.

Means for Solving the Problem

To achieve the object, an anonymous signature system in an embodiment of the present invention is an anonymous signature system in which a signature σ is anonymized by an agent specified by a signer, including: system parameter generation means configured to take as input a safe parameter, to generate a system parameter ρ that does not depend on the agent; setup means configured to take as input the system parameter ρ, to generate an agent private key w and an agent public key $g_A$; key generation means configured to take as input the system parameter ρ, to generate a private key x and a public key y of the signer; signature generation means configured to take as input the private key x, a message m on which the signature σ is to be put, and the agent public key $g_A$ of the agent specified by the signer, to generate the signature σ to be put on the message m; anonymization means configured to take as input an identifier i of the signer, the agent private key w, the signature σ, a ring L representing a group to which the signer belongs, a list $y_L$ of public keys y of signers belonging to the ring L, and the message m, to generate a ring signature σ' by anonymizing the signature σ; and verification means configured to take as input the ring L, the list $y_L$, the message m, and the ring signature σ', to output a verification result b for the message m.

Effects of the Invention

It is possible to reduce time and effort in key generation following a change of specified agent.

DESCRIPTION OF EMBODIMENTS

Hereinafter, an embodiment of the present invention will be described. In the embodiment of the present invention, an anonymous signature system 1 will be described in which regeneration of a key (a public key of a signer) following a change of specified agent is not needed in agent-specified anonymizable signature.

<Notation>

In the embodiment of the present invention, the following notations are introduced.

Assigning an element selected uniformly at random from a set X to x is denoted as follows.

$$x \xleftarrow{\$} X \text{ or } X \xrightarrow{\$} x \quad [\text{Math. 1}]$$

This is also denoted as "$x \leftarrow^s X$" or "$X \rightarrow^s x$" hereinafter.

Assigning an output of a probabilistic polynomial time algorithm Alg( ) to x is denoted as follows.

$$x \xleftarrow{\$} Alg() \text{ or } x \xrightarrow{\$} Alg() \quad [\text{Math. 1}]$$

This is also denoted as "$x \leftarrow^s Alg( )$" or "$Alg( ) \rightarrow^s x$".

Defining y by x or substituting x into y is denoted as "$y \leftarrow x$" or "$x \rightarrow y$". However, "$\rightarrow$" or "$\leftarrow$" may represent a mapping (or a function) depending on the context.

When "$\rightarrow$" or "$\leftarrow$" represents a mapping, it will be explicitly noted that the symbol represents a mapping (or a function).

<Anonymizable Signature>

First, anonymizable signature, which is a conventional technology, will be described. It is assumed that $k \in N$ (N is a set of all natural numbers) is a safe parameter, and that $M = \{0, 1, \ldots\}$ is a set of signers. A subset $L \subset M$ of the set of signers is referred to as a ring. Moreover, it is assumed that an identifier (for example, a signer ID or the like) of a signer is i, and that a private key and a public key of a signer with an identifier i is $x_i$ and $y_i$, respectively. However, when the identifier i of a signer is not taken into consideration, a private key and a public key are simply denoted as x and y, respectively.

Further, for simplicity, it is defined, for any sign "a" and a ring L, that $a_L = (a_i)_{i \in L}$ hereinafter. In other words, for example, when $L = \{L0, L1, \ldots\}$, then $a_L = (a_{L0}, a_{L1}, \ldots)$.

At this time, an anonymizable signature scheme $\Sigma$ is constituted with four probabilistic polynomial time algorithms (KeyGen, Sign, Anonymize, Verify) that satisfy a construction given below.

Key generation algorithm KeyGen($1^k$)$\rightarrow^s$ (x, y): A probabilistic polynomial time algorithm that takes as input a safe parameter $1^k$, and outputs a private key x and a public key y.

Signature algorithm Sign(x, m)$\rightarrow^s$ r: A probabilistic polynomial time algorithm that takes as input a private key x and a message m, and outputs a signature r. The message m is an object onto which the signature r is to be put.

Anonymization algorithm Anonymize(i, r, L, $y_L$, m)$\rightarrow^s \sigma$ or $\bot$: A probabilistic polynomial time algorithm that takes as input an identifier i of a signer, a ring $L \subset M$, a list $y_L$ of public keys of signers belonging to the ring L, and a message m, and outputs a ring signature $\sigma$ or reject $\bot$. The ring signature $\sigma$ is also referred to as an anonymous signature $\sigma$. As for the public key list $y_L$, $y_L = (y_k)_{k \in L}$.

Verification algorithm Verify(L, $y_L$, m, $\sigma$)$\rightarrow^s$ 0 or 1: A probabilistic polynomial time algorithm that takes as input a ring L, a list $y_L$ of public keys of signers belonging to the ring L, a message m, and a ring signature $\sigma$, and outputs a single bit $b \in \{0, 1\}$. For example, "b=0" represents failure in verification, and "b=1" represents success in verification.

Construction: For a message $m \in \{0, 1\}^*$ with any polynomial length, a ring $L \subset M$ with any polynomial length, and an identifier $i \in L$ of any signer, a probability $$Pr\left[\text{Verify }(L, y_L, m, \text{Anonymize }(\text{Sign }(x_i, m), L, y_L, m)) = \\ 0 \mid \forall_j \in L, (x_j, y_j) \xleftarrow{\$} KeyGen(1^k)\right] \quad [\text{Math. 3}]$$

is negligible with respect to k.

As described above, to ensure anonymity of a signer, a signature r has to be private between the signer and an agent. That is to say, if an attacker obtains the signature r due to leakage, the attacker, similarly to the agent, can find that the signer has put the signature r. Accordingly, agents need to securely manage signatures entrusted by signers as secrets. Generally, in many cases, an agent is entrusted with many signatures by many signers, and a quantity of secrets to be securely managed increases in proportion to the number of signatures entrusted. Here, an agent is, for example, a third party that keeps and manages signatures.

For a specific configuration of the above-described conventional anonymizable signature, for example, Non-Patent Literature 1 mentioned above can be referenced.

<Agent-Specified Anonymizable Signature>

Next, agent-specified anonymizable signature, which is a conventional technology, will be described. An agent-specified anonymizable signature scheme $\Sigma$ is constituted with five probabilistic polynomial time algorithms (Setup, KeyGen, Sign, Anonymize, Verify) that satisfy a construction given below.

Agent key generation algorithm Setup($1^k$)$\rightarrow^s$ (w, $\rho$): A probabilistic polynomial time algorithm that takes as input a safe parameter $1^k$, and outputs an agent private key w and a system parameter $\rho$. The system parameter $\rho$ is common reference information known to participants (signers) who participate in the agent-specified anonymization signature scheme $\Sigma$, and is generated and made public by each agent. The agent private key w is private information used by an agent to anonymize a signature r.

Key generation algorithm KeyGen($\rho$)$\rightarrow^s$ (x, y): A probabilistic polynomial time algorithm that takes as input a system parameter $\rho$, and outputs a private key x and a public key y. In other words, the key generation algorithm KeyGen($\rho$) takes as input a system parameter $\rho$ made public by an agent specified by a signer, among one or more agents, and outputs a private key x and a public key y.

Signature algorithm Sign(x, m)→$^s$r: A probabilistic polynomial time algorithm that takes as input a private key x and a message m, and outputs a signature r.

Anonymization algorithm Anonymize(i, w, r, L, $y_L$, m)→$^s$σ or ⊥: A probabilistic polynomial time algorithm that takes as input an identifier i of a signer, a signature r of the signer, a ring L⊂M, a list $y_L$ of public keys of signers belonging to the ring L, a message m corresponding to the signature r, and an agent private key w, and outputs a ring signature σ or reject ⊥. The ring signature σ is also referred to as an anonymous signature.

Verification algorithm Verify(L, $y_L$, m, σ)→$^s$0 or 1: A probabilistic polynomial time algorithm that takes as input a ring L, a list $y_L$ of public keys of signers belonging to the ring L, a message m, and a ring signature σ, and outputs a single bit b∈{0, 1}. For example, "b=0" indicates that the message m is invalid, and "b=1" indicates that the message m is valid.

Construction: For a message m∈{0, 1}* with any polynomial length, a ring L⊂M with any polynomial length, and an identifier i∈L of any signer, a probability $$Pr\left[Verify(L, y_L, m, \sigma) = 0 \middle| \begin{array}{l} (w, \rho) \xleftarrow{\$} Setup(1^k), \\ \forall j \in L, (x_j, y_j) \xleftarrow{\$} KeyGen(\rho), \\ r \xleftarrow{\$} Sign(x_i, m), \\ \sigma \xleftarrow{\$} Anonymize(i, w, r, L, y_L, m) \end{array}\right]$$ [Math. 4]

is negligible with respect to k.

In the above-described agent-specified anonymizable signature, even if a signature r is leaked to an attacker, it is computationally difficult to identify which signature the signature r is, in terms of which private key $x_i$ is used to create the signature, unless an agent private key w is leaked. In other words, in the agent-specified anonymizable signature, since the agent private key w is required to anonymize the signature r, only an agent specified by a signer can perform signature verification and anonymization. Accordingly, in the agent-specified anonymizable signature, anonymity of the signature r can be ensured unless the agent private key w is leaked.

For a specific configuration of the above-described agent-specified anonymizable signature, for example, Non-Patent Literature 1 mentioned above can be referenced.

<Agent-Independent Agent-Specified Anonymizable Signature>

In the embodiment of the present invention, an agent-specified anonymizable signature (also referred to as "agent-independent agent-specified anonymizable signature") will be described, as an improvement of the above-described agent-specified anonymizable signature, to eliminate regeneration of a key (a public key of a signer) following a change of specified agent.

Meanwhile, for example, in the specific configuration of the agent-specified anonymizable signature according to Non-Patent Literature 1 mentioned above, a system parameter ρ is configured by using a generator g generated by an agent, and a signer performs generation of a private key x and a public key y and generation of a signature r by using the system parameter ρ. Accordingly, when the specified agent is changed, the signer needs to regenerate a public key y.

The agent-independent agent-specified anonymizable signature is therefore configured such that a generator g whose discrete logarithm is unknown to anyone is generated by using a hash value of a common reference character string crs that does not depend on an agent, and a system parameter ρ is configured from the generator g. Thus, in the agent-independent agent-specified anonymizable signature, regeneration of a public key y can be eliminated even when the specified agent is changed.

An agent-independent agent-specified anonymizable signature scheme Σ is constituted with six probabilistic polynomial time algorithms (CrsGen, Setup, KeyGen, Sign, Anonymize, Verify) that satisfy a construction given below.

Common reference information generation algorithm CrsGen($1^k$)→$^s$ρ: A probabilistic polynomial time algorithm that takes as input a safe parameter $1^k$, and outputs a system parameter ρ. The system parameter ρ is generated from a generator g that is generated based on a hash value of a common reference character string crs.

Agent key generation algorithm Setup(ρ)→$^s$ (w, $g_A$): A probabilistic polynomial time algorithm that takes as input a system parameter ρ, and outputs an agent private key w and an agent public key $g_A$.

Key generation algorithm KeyGen(ρ)→$^s$ (x, y): A probabilistic polynomial time algorithm that takes as input a system parameter ρ, and outputs a private key x and a public key y.

Signature algorithm Sign(x, m, $g_A$)→$^s$σ: A probabilistic polynomial time algorithm that takes as input a private key x, a message m, and an agent public key $g_A$, and outputs a signature σ.

Anonymization algorithm Anonymize (i, w, σ, L, $y_L$, m)→$^s$σ' or ⊥: A probabilistic polynomial time algorithm that takes as input an identifier i of a signer, an agent private key w, a signature σ of the signer, a ring L⊂M, a list $y_L$ of public keys of signers belonging to the ring L, and a message m corresponding to the signature σ, and outputs a ring signature σ' or reject ⊥. The ring signature σ is also referred to as an anonymous signature.

Verification algorithm Verify(L, $y_L$, m, σ')→$^s$0 or 1: A probabilistic polynomial time algorithm that takes as input a ring L, a list $y_L$ of public keys of signers belonging to the ring L, a message m, and a ring signature σ', and outputs a single bit b∈{0, 1}. For example, "b=0" indicates that the message m is invalid, and "b=1" indicates that the message m is valid.

Construction: For a message m∈{0, 1}* with any polynomial length, a ring L⊂M with any polynomial length, and an identifier i∈L of any signer, a probability $$Pr\left[Verify(L, y_L, m, \sigma') = 0 \middle| \begin{array}{l} \rho \xleftarrow{\$} CrsGen(1^k), \\ (w, g_A) \xleftarrow{\$} Setup(\rho), \\ \forall j \in L, (x_j, y_j) \xleftarrow{\$} KeyGen(\rho), \\ \sigma \xleftarrow{\$} Sign(x_i, m, g_A), \\ \sigma' \xleftarrow{\$} Anonymize(i, w, \sigma, L, y_L, m) \end{array}\right]$$ [Math. 5]

is negligible with respect to k.

In the above-described agent-independent agent-specified anonymizable signature, as in the conventional agent-specified anonymizable signature, even if a signature σ is leaked to an attacker, it is computationally difficult to identify which signature the signature σ is, in terms of which private key $x_i$ is used to create the signature, unless an agent private key w is leaked. Accordingly, in the agent-independent agent-specified anonymizable signature, only an agent specified by a signer can perform signature verification and anonymization, and a public key y does not need to be regenerated even when the signer changes the specified agent.

Here, the above-described agent-independent agent-specified anonymizable signature can be configured specifically by using a Trapdoor DDH group, similarly to the agent-specified anonymizable signature according to Non-Patent Literature 1. Accordingly, to implement such a specific configuration, several notions will be described hereinafter.

<Trapdoor DDH>

For example, the following Reference Literature 1 describes a specific configuration of a special Trapdoor DDH group made by extending pairing.

[Reference Literature 1]

F. Hoshino, "A Variant of Diffie-Hellman Problem and How to Prove Independency." SCIS 2014 The 31st Symposium on Cryptography and Information Security Kagoshima, Japan, Jan. 21-24, 2014.

This Trapdoor DDH group is used to give a specific configuration of the above-described agent-independent agent-specified anonymization signature. An outline of the Trapdoor DDH group is as follows.

p is assumed to be a sufficiently large prime number.

E is assumed to be a supersingular elliptic curve over a finite field $F_p$, and to be divisible by a prime number q whose order is sufficiently large. Note that $F_p=Z/pZ$ (Z is a ring of integers).

α is assumed to be a generator of $E(F_p)[q]$.

At this time, it is assumed that $G:=GL(n, \langle\alpha\rangle)\subseteq\langle\alpha\rangle^{n^x}$, and $R:=GL(n, F_q)\subseteq F_q^{n\times n}$. Thus, G is an abelian group based on a group operation that is element-wise elliptic addition, and such an abelian group can be regarded as the Trapdoor DDH group. Moreover, R is a noncommutative ring, and can be regarded as the discrete logarithm with respect to G. Further, a natural pairing mapping can be defined over G, which will be described later.

<Discrete Logarithm>

It is assumed that a cyclic group is $\langle\alpha\rangle$, and order is q (where q is a prime number). At this time, when $$\langle\alpha\rangle^{n\times n} \rightarrow F_q^{n\times n} \quad [\text{Math. 6}]$$
$$\begin{pmatrix} \alpha^{r_{11}} & \cdots & \alpha^{r_{1n}} \\ \vdots & \ddots & \vdots \\ \alpha^{r_{n1}} & \cdots & \alpha^{r_{nn}} \end{pmatrix} \mapsto \begin{pmatrix} r_{11} & \cdots & r_{1n} \\ \vdots & \ddots & \vdots \\ r_{n1} & \cdots & r_{n,n} \end{pmatrix},$$

then with respect to $$h:=(\alpha^{r_{ij}}), \quad [\text{Math. 7}]$$

$$r:=(r_{ij}) \quad [\text{Math. 8}]$$

is referred to as a discrete logarithm. At this time, h is also denoted as $\alpha^r$. When r is an identity matrix of n×n, $\alpha^r$ is denoted as $I_n$. Note that as described above, $G=GL(n, \langle\alpha\rangle)$ is a subgroup of $\langle\alpha\rangle^{n\times n}$ whose discrete logarithm is regular, and is an abelian group whose group operation is element-wise elliptic addition.

As an example, operations for following g, h∈G when n=2 will be illustrated.

$$g := \begin{pmatrix} g_{11} & g_{12} \\ g_{21} & g_{21} \end{pmatrix} \in G, h := \begin{pmatrix} h_{11} & h_{12} \\ h_{21} & h_{22} \end{pmatrix} \in G \quad [\text{Math. 9}]$$

When both the group operation (elliptic addition) of $\langle\alpha\rangle$ and addition of G are expressed in a form of addition, an expression is as follows.

$$g+h = h+g = \begin{pmatrix} g_{11}+h_{11} & g_{12}+h_{12} \\ g_{21}+h_{21} & g_{22}+h_{22} \end{pmatrix} \in G \quad [\text{Math. 10}]$$

However, the embodiment of the present invention shows an analogy to the notion of ordinary discrete logarithm, both the group operation (elliptic addition) of $\langle\alpha\rangle$ and the addition of G are expressed in a form of multiplication, namely, as follows.

$$gh = hg = \begin{pmatrix} g_{11}h_{11} & g_{12}h_{12} \\ g_{21}h_{21} & g_{22}h_{32} \end{pmatrix} \in G \quad [\text{Math. 11}]$$

<Right Exponentiation, Left Exponentiation>

Assuming that g, $g_1$, $g_2\in G$, when matrices composed of exponent portions of respective elements of g, $g_1$, $g_2$ are x, $x_1$, $x_2\in R$, respectively, it is assumed that a left exponentiation and a right exponentiation are defined such that following relationships are satisfied.

$$x = x_1 x_2 = x_1 x_2 \in R \quad [\text{Math. 12}]$$
$$\mathcal{I} \quad \mathcal{I} \quad \mathcal{I} \quad \downarrow$$
$$g = {}^{x_1}g_2 = g_1^{x_2} \in G$$

At this time, when R is a noncommutative ring with respect to the right exponentiation and the left exponentiation, there exists a probabilistic polynomial time algorithm for calculating the right exponentiation and the left exponentiation, with respect to [G, R], as follows.

Non-degenerate bi-homomorphism rpow with respect to G, R: G×R→G

Non-degenerate bi-homomorphism lpow with respect to G, R: R×G→G

Note that rpow is a mapping for calculating the right exponentiation, and lpow is a mapping for calculating the left exponentiation. Both rpow and lpow satisfy the associative law.

As an example, operations for x, y∈R when n=2 will be illustrated as follows. The operations are considered as matrix multiplication ($^x(\alpha^y)=\alpha^{xy}$, $(\alpha^y)^x=\alpha^{yx}$) over discrete logarithms.

$$x := \begin{pmatrix} x_{11} & x_{12} \\ x_{21} & x_{22} \end{pmatrix} \in R \subseteq F_q^{2\times 2} \quad [\text{Math. 13}]$$

$$g := \begin{pmatrix} g_{11} & g_{12} \\ g_{21} & g_{22} \end{pmatrix} \in G \subseteq \langle\alpha\rangle^{2\times 2}$$

At this time, expressions for $^xg$, $g^x$ in a form of multiplication are as follows. An expression for $^xI_n$, $I_n^x$ is also given below.

$$^x g := \begin{pmatrix} g_{11}^{x_{11}} g_{21}^{x_{12}} & g_{12}^{x_{11}} g_{22}^{x_{12}} \\ g_{11}^{x_{21}} g_{21}^{x_{22}} & g_{12}^{x_{21}} g_{22}^{x_{22}} \end{pmatrix} \in G \quad \text{[Math. 14]}$$

$$g^x := \begin{pmatrix} g_{11}^{x_{11}} g_{12}^{x_{21}} & g_{11}^{x_{12}} g_{12}^{x_{22}} \\ g_{21}^{x_{11}} g_{22}^{x_{21}} & g_{21}^{x_{12}} g_{22}^{x_{22}} \end{pmatrix} \in G$$

$$^x I_n = I_n^x = \alpha^x$$

<Key Exchange>

Although not directly related to the agent-independent agent-specified anonymizable signature, key exchange can be also implemented because "$^x(g^y) = (^x g)^y$" holds for $x, y \in R$, $g \in G$, as mentioned above. In other words, key exchange can be performed through (1) to (4) described below.

(1) Alice generates $x \in R$, and transmits $^x g$ to Bob.
(2) Bob generates $y \in R$, and transmits $g^y$ to Alice.
(3) Bob calculates $K_A = {}^x(g^y)$.
(4) Alice calculates $K_B = (^x g)^y$.

As mentioned above, as "$^x(g^y) = (^x g)^y$" holds for $x, y \in R$, $g \in G$, $K_A = K_B$ holds, and accordingly, key exchange can be performed.

<Pairing>

A natural pairing mapping can be defined over G as follows.

$$e: \langle \alpha \rangle^{n \times n} \times \langle \alpha \rangle^{n \times n} \to \mu_q^{n \times n}$$

This pairing mapping is considered as matrix multiplication ($e(\alpha^x, \alpha^y) = \zeta^{xy}$) over discrete logarithms.

As an example, when n=2, g, h $\in$ G are assumed to be as follows.

$$g := \begin{pmatrix} g_{11} & g_{12} \\ g_{21} & g_{22} \end{pmatrix} \in G, h := \begin{pmatrix} h_{11} & h_{12} \\ h_{21} & h_{22} \end{pmatrix} \in G \quad \text{[Math. 16]}$$

At this time, a pairing mapping e(g, h) can be defined by the following expression.

$$e(g, h) := \begin{pmatrix} e(g_{11}, h_{11})e(g_{12}, h_{21}) & e(g_{11}, h_{12})e(g_{12}, h_{22}) \\ e(g_{21}, h_{11})e(g_{22}, h_{21}) & e(g_{21}, h_{12})e(g_{22}, h_{22}) \end{pmatrix} \in \mu_q^{2 \times 2} \quad \text{[Math. 17]}$$

<Overall Configuration of Anonymous Signature System 1>

Figure 1:
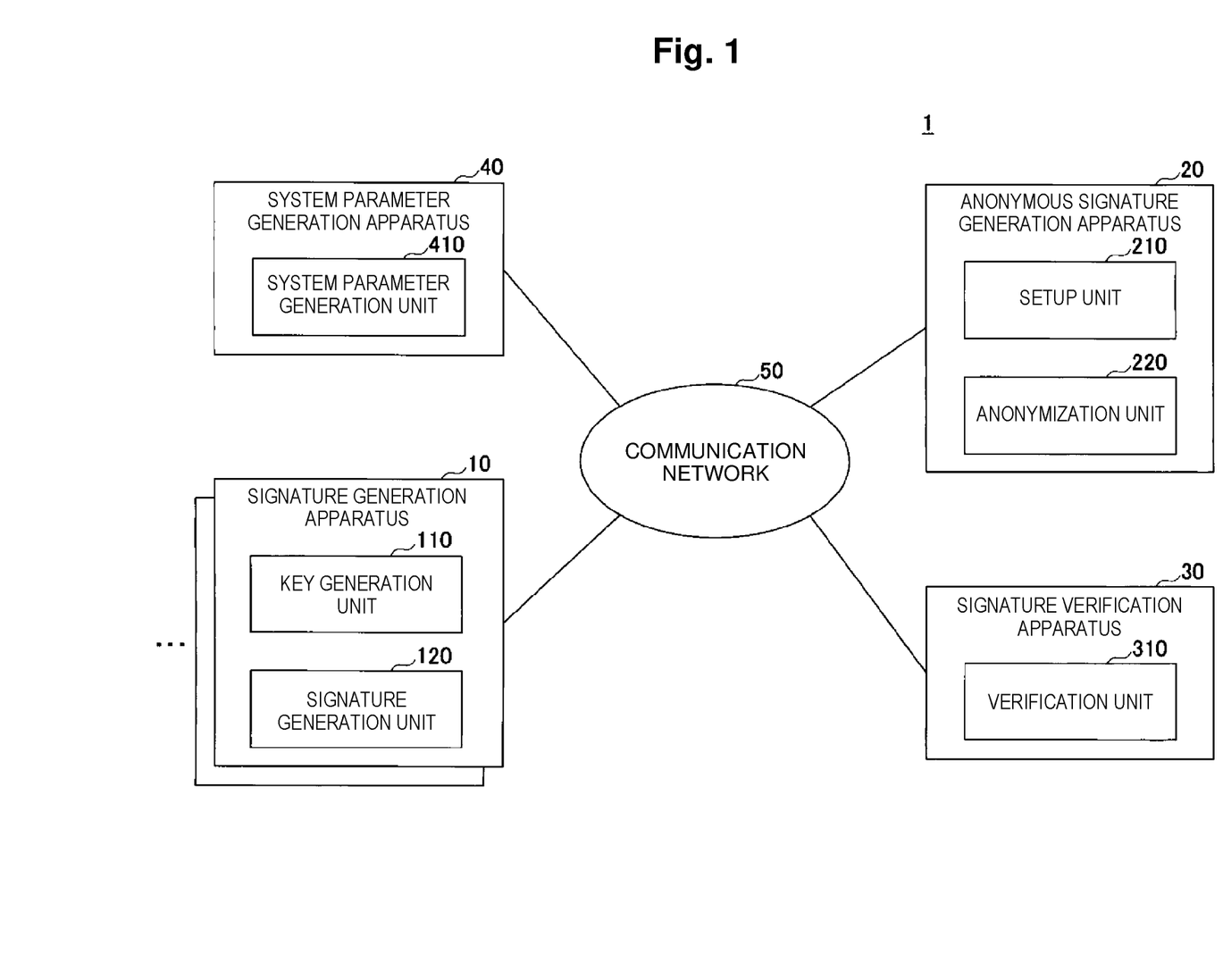
FIG. 1 shows an example of an overall configuration of an anonymous signature system in an embodiment of the present invention.

Hereinafter, an anonymous signature system 1 that implements the above-described agent-independent agent-specified anonymizable signature scheme Σ will be described with reference to FIG. 1. FIG. 1 shows an example of an overall configuration of the anonymous signature system 1 in the embodiment of the present invention.

As shown in FIG. 1, the anonymous signature system 1 in the embodiment of the present invention includes a plurality of signature generation apparatuses 10, one or more anonymous signature generation apparatuses 20, one or more signature verification apparatuses 30, and one or more system parameter generation apparatuses 40. The signature generation apparatuses 10, the anonymous signature generation apparatus 20, the signature verification apparatus 30, and the system parameter generation apparatus 40 are communicably connected to one another, for example, through a communication network 50 such as the Internet.

Each signature generation apparatus 10 is a computer or a computer system used by a signer, and performs generation of a private key x and a public key y and generation (creation) of a signature σ. Each signature generation apparatus 10 includes a key generation unit 110 and a signature generation unit 120.

The key generation unit 110 executes the key generation algorithm KeyGen(ρ) in the agent-independent agent-specified anonymizable signature scheme Σ. Specifically, the key generation unit 110 takes as input a system parameter ρ that does not depend on an agent (that is, an agent-independent system parameter ρ, in other words, a system parameter ρ commonly used by each agent), and outputs a private key x and a public key y. The outputted private key x is stored, for example, in an auxiliary storage device or the like of the signature generation apparatus 10. On the other hand, the outputted public key y is made public by using any method.

The signature generation unit 120 executes the signature algorithm Sign(x, m, $g_A$) in the agent-independent agent-specified anonymizable signature scheme Σ. Specifically, the signature generation unit 120 takes as input a private key x, a message m, and an agent public key $g_A$, and outputs a signature σ. Here, for the agent public key $g_A$, an agent public key $g_A$ of an agent specified by a signer is used. The outputted signature σ is transmitted, along with the message m, to an anonymous signature generation apparatus 20 of the agent specified by the signer.

Note that the key generation unit 110 and the signature generation unit 120 are implemented, for example, through processing that one or more programs installed in the signature generation apparatus 10 cause a processor or the like to perform.

The anonymous signature generation apparatus 20 is a computer or a computer system used by an agent, and performs generation of an agent private key w and an agent public key $g_A$ and anonymization of a signature σ. The anonymous signature generation apparatus 20 includes a setup unit 210 and an anonymization unit 220.

The setup unit 210 executes the agent key generation algorithm Setup(ρ). Specifically, the setup unit 210 takes as input a system parameter ρ that does not depend on an agent, and outputs an agent private key w and an agent public key $g_A$. The outputted agent private key w is stored, for example, in an auxiliary storage device or the like of the anonymous signature generation apparatus 20. On the other hand, the outputted agent public key $g_A$ is made public by using any method.

The anonymization unit 220 executes the anonymization algorithm Anonymize(i, w, σ, L, $y_L$, m). Specifically, the anonymization unit 220 takes as input an identifier i of a signer, an agent private key w, a signature σ of the signer, a ring L, a list $y_L$ of public keys of signers belonging to the ring L, and a message m corresponding to the signature σ, and outputs a ring signature σ' or reject ⊥.

Note that the setup unit 210 and the anonymization unit 220 are implemented, for example, through processing that one or more programs installed in the anonymous signature generation apparatus 20 cause a processor or the like to perform.

The signature verification apparatus 30 is a computer or a computer system used by an agent or a third party different from the agent, and performs verification of a ring signature σ'. The signature verification apparatus 30 includes a verification unit 310.

The verification unit 310 executes the verification algorithm Verify(L, $y_L$, m, σ'). Specifically, the verification unit 310 takes as input a ring L, a list $y_L$ of public keys of signers belonging to the ring L, a message m, and a ring signature σ', and outputs a single bit b ∈ {0, 1}.

Note that the verification unit 310 is implemented through processing that one or more programs installed in the signature verification apparatus 30 cause a processor or the like to perform.

The system parameter generation apparatus 40 is a computer or a computer system used by a manager of a system parameter ρ that does not depend on an agent (for example, a third party different from every agent, an agent that represents all agents, or the like), and performs generation of a system parameter ρ. The system parameter generation apparatus 40 includes a system parameter generation unit 410.

The system parameter generation unit 410 executes the common reference information generation algorithm CrsGen. Specifically, the system parameter generation unit 410 takes as input a safe parameter $1^k$, and outputs a system parameter ρ. The system parameter ρ is information commonly referenced by each signer and each agent, and is made public by using any method.

Note that the system parameter generation unit 410 is implemented, for example, through processing that one or more programs installed in the system parameter generation apparatus 40 cause a processor or the like to perform.

With the foregoing, the anonymous signature system 1 in the embodiment of the present invention can implement the agent-independent agent-specified anonymizable signature scheme Σ. The agent-independent agent-specified anonymizable signature scheme Σ is assumed to satisfy the construction represented by Math. 5 mentioned above.

Note that the configuration of the anonymous signature system 1 shown in FIG. 1 is an example, and other configurations may be adopted. For example, the anonymous signature generation apparatus 20 and the signature verification apparatus 30 may be integrally configured as a single apparatus.

<Details of Processing by Anonymous Signature System 1>

It is assumed that G is the above-described Trapdoor DDH group, that R is the discrete logarithm with respect to G, and that $G_T = GL(n, \langle e(\alpha, \alpha) \rangle)$. Moreover, it is assumed that e: G×G→$G_T$ is a pairing mapping of the above-described Trapdoor DDH group, and that a mapping H: {0, 1}*→G and a mapping H': {0, 1}*→R are mutually independent random oracles. Further, a system parameter ρ is assumed to have a form of ρ=(R, G, $G_T$, e, g, H, H').

(System Parameter Generation Processing)

Figure 2:
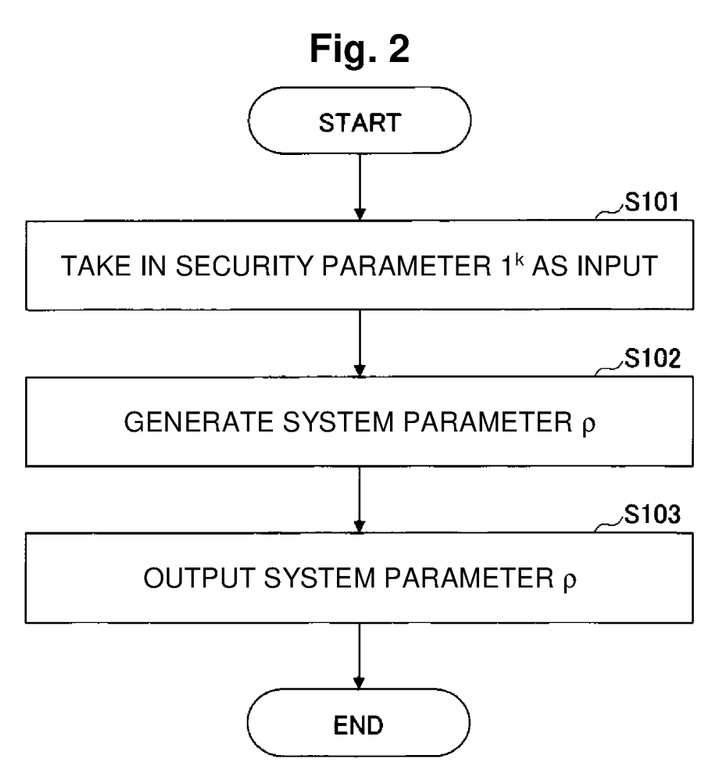
FIG. 2 is a flowchart showing an example of system parameter generation processing in the embodiment of the present invention.

First, system parameter generation processing performed by the system parameter generation unit 410 will be described with reference to FIG. 2. FIG. 2 is a flowchart showing an example of the system parameter generation processing in the embodiment of the present invention.

Step S101: First, the system parameter generation unit 410 takes as input a safe parameter $1^k$.

Step S102: Subsequently, the system parameter generation unit 410 generates a system parameter ρ as follow.

$crs \leftarrow \{0,1\}^k$ $g \leftarrow H(crs)$ $\rho \leftarrow (R, G, G_T, e, g, H, H')$ Step S103: Lastly, the system parameter generation unit 410 outputs the system parameter ρ.

Thus, the system parameter ρ that does not depend on an agent is generated. As described above, a generator g whose discrete logarithm is unknown to anyone is generated by using a hash value of a common reference character string crs that is generated based on the safe parameter $1^k$, and the system parameter ρ is then configured by using the generator g. The system parameter ρ is made public to a signer and an agent.

(Setup Processing)

Figure 3:
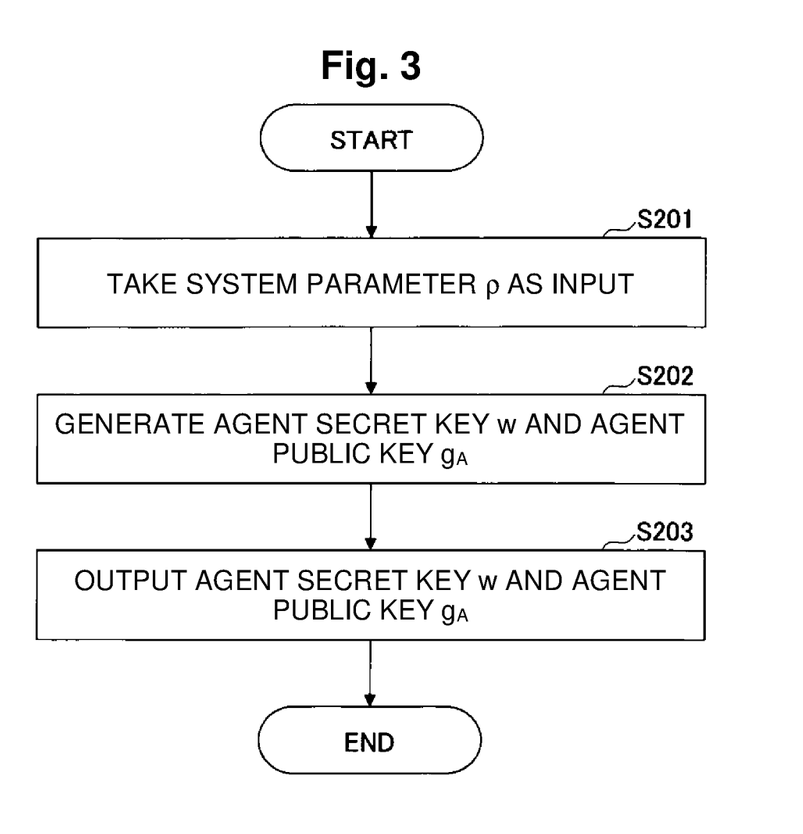
FIG. 3 is a flowchart showing an example of setup processing in the embodiment of the present invention.

Next, setup processing performed by the setup unit 210 will be described with reference to FIG. 3. FIG. 3 is a flowchart showing an example of the setup processing in the embodiment of the present invention. In the setup processing shown in FIG. 3, a case will be described in which the anonymous signature generation apparatus 20 of an agent, among agents, generates an agent private key w and an agent public key $g_A$.

Step S201: First, the setup unit 210 takes as input a system parameter ρ.

Step S202: Subsequently, the setup unit 210 generates an agent private key w and an agent public key $g_A$ as follows.

$$w \xleftarrow{\$} R \qquad \text{[Math. 18]}$$

$$g_A \leftarrow I_n^w$$

Step S203: Lastly, the setup unit 210 outputs the agent private key w and the agent public key $g_A$.

Thus, the agent private key w and the agent public key $g_A$ are generated. The agent private key w is stored, for example, in the auxiliary storage device or the like of the anonymous signature generation apparatus 20. On the other hand, the system parameter ρ is made public to a signer.

(Key Generation Processing)

Figure 4:
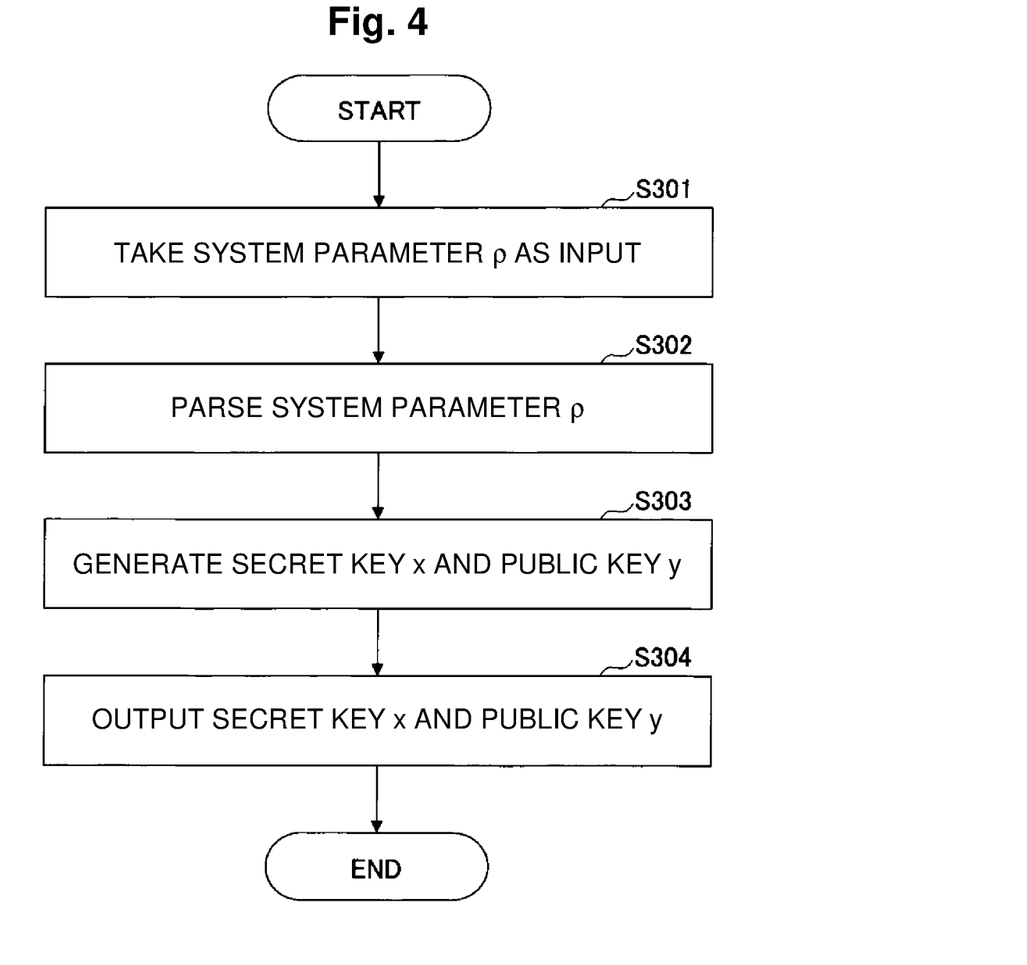
FIG. 4 is a flowchart showing an example of key generation processing in the embodiment of the present invention.

Next, key generation processing performed by the key generation unit 110 will be described with reference to FIG. 4. FIG. 4 is a flowchart showing an example of the key generation processing in the embodiment of the present invention. In the key generation processing shown in FIG. 4, a case will be described in which the signature generation apparatus 10 of a certain signer belonging to a ring L generates a private key x and a public key y.

Step S301: First, the key generation unit 110 takes as input a system parameter ρ. At this time, the key generation unit 110 takes as input the system parameter ρ that is generated and made public by the system parameter generation apparatus 40.

Step S302: Subsequently, the key generation unit 110 parses the system parameter ρ such that (R, G, $G_T$, e, g, H, H')←ρ. In other words, the key generation unit 110 sets the system parameter ρ as (R, G, $G_T$, e, g, H, H').

Step S303: Subsequently, the key generation unit 110 generates a private key x and a public key y, by setting "x←$^\$$R", and then, "y←$^x$g".

Step S304: Lastly, the key generation unit 110 outputs the private key x and the public key y.

Thus, the private key x and the public key y of the certain signer belonging to the ring L are generated. At this time, as described above, the private key x and the public key y are generated by using the system parameter ρ that does not depend on an agent. Accordingly, even when the specified agent is changed, the signer does not need to regenerate a private key x and a public key y. The private key x is stored, for example, in the auxiliary storage device or the like of the signature generation apparatus 10. On the other hand, the public key y is made public to an agent.

(Signature Processing)

Figure 5:
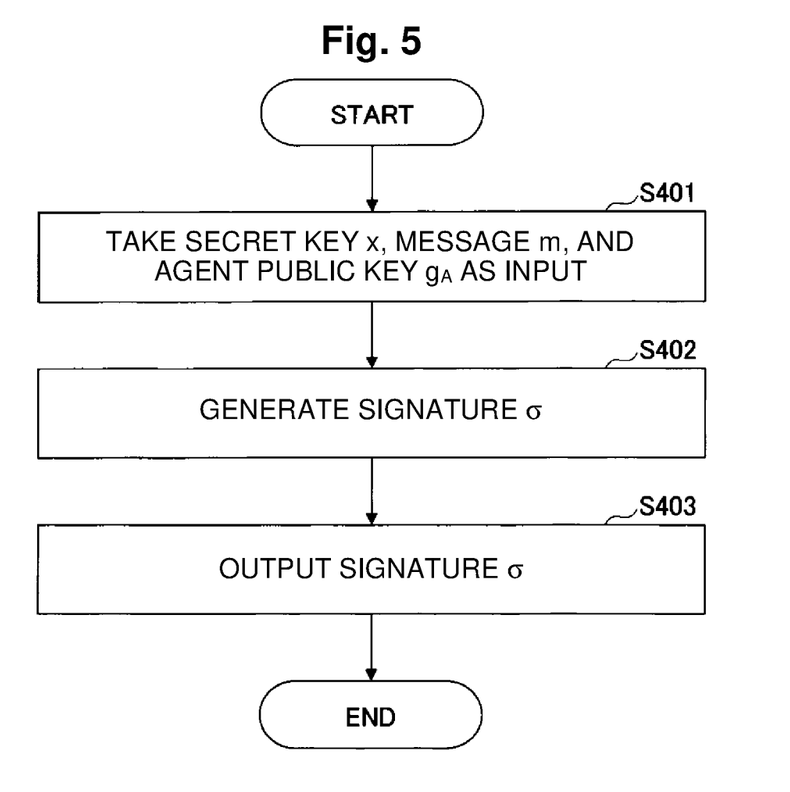
FIG. 5 is a flowchart showing an example of signature generation processing in the embodiment of the present invention.

Next, signature processing performed by the signature generation unit 120 will be described with reference to FIG. 5. FIG. 5 is a flowchart showing an example of the signature generation processing in the embodiment of the present invention. In the signature processing shown in FIG. 5, a case will be described in which the signature generation apparatus 10 of the certain signer belonging to the ring L generates (creates) a signature.

Step S401: First, the signature generation unit 120 takes as input the private key x, a message m, and an agent public key $g_A$. At this time, the signature generation unit 120 takes as input an agent public key $g_A$ that is made public by an agent specified by the signer.

Step S402: Subsequently, the signature generation unit 120 generates a signature σ such that σ→($^xH$ (ρ, m), $^xg_A$). ρ used here is the system parameter ρ that is generated and made public by the system parameter generation apparatus 40.

Step S403: Lastly, the signature generation unit 120 outputs the signature σ.

Thus, the signature σ is generated. The signature σ is transmitted, along with the message m, to the anonymous signature generation apparatus 20 of the agent specified by the signer.

(Anonymization Processing)

Figure 6:
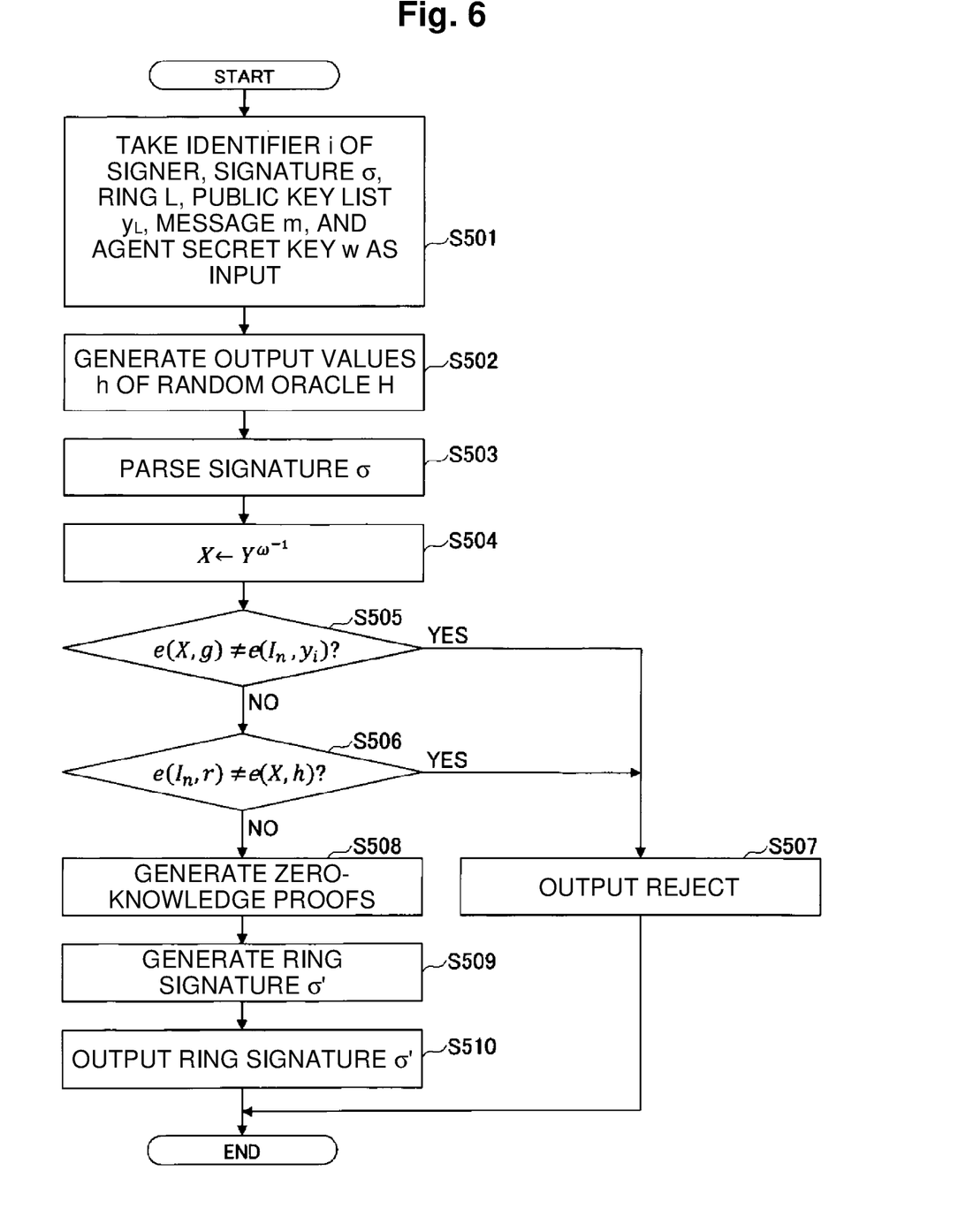
FIG. 6 is a flowchart showing an example of anonymization processing in the embodiment of the present invention.

Next, anonymization processing performed by the anonymization unit 220 will be described with reference to FIG. 6. FIG. 6 is a flowchart showing an example of the anonymization processing in the embodiment of the present invention. In the anonymization processing shown in FIG. 6, a case will be described in which a signature σ of a signer with an identifier i is anonymized.

Step S501: First, the anonymization unit 220 takes as input the identifier i of the signer, the signature σ of the signer, a ring L, a list $y_L$ of public keys of signers belonging to the ring L, a message m corresponding to the signature σ, and an agent private key w.

Step S502: Subsequently, the anonymization unit 220 generates output values h of a random oracle H such that h→H(ρ, m). For the system parameter ρ, a system parameter ρ that is generated and made public by the system parameter generation apparatus 40 is used.

Step S503: Subsequently, the anonymization unit 220 parses the signature σ such that (r, Y)←σ. At this time, the anonymization unit 220 parses, for example, σ that is coded as ordered pairs of elements over G by the signature generation unit 120, into ordered pairs (r, Y) of elements over G.

Step S504: Subsequently, the anonymization unit 220 executes $$X \leftarrow Y^{w^{-1}}. \quad [\text{Math. 19}]$$

Step S505: Subsequently, the anonymization unit 220 determines whether or not "e(X, g)≠e($I_n$, $y_i$)" is satisfied.

Step S506: When it is determined in step S505 that "e(X, g)≠e($I_n$, $y_i$)" is not satisfied, the anonymization unit 220 determines whether or not "e($I_n$, r)≠e(X, h)" is satisfied.

Step S507: When it is determined in step S505 that "e(X, g)≠e($I_n$, $y_i$)" is satisfied, or when it is determined in step S506 that "e($I_n$, r)≠e(X, h)" is satisfied, the anonymization unit 220 outputs reject ⊥. In such a case, the signature σ cannot be anonymized.

Step S508: When it is determined in step S506 that "e($I_n$, r)≠e(X, h)" is not satisfied, the anonymization unit 220 generates zero-knowledge proofs for r and X such that (∃j∈R, e($I_n$, r)=e(X, h)), through following steps S508-1 to S508-4.

Step S508-1: The anonymization unit 220 executes $$t_1, t_2, t_3, \beta \xleftarrow{\$} R \quad [\text{Math. 20}]$$
$$V \leftarrow {}^\beta e(I_n, y_i), U \leftarrow {}^\beta e(I_n, r)$$
$$T_{1,i} \leftarrow {}^{t_1} e(I_n, y_i).$$

Step S508-2: Subsequently, with respect to any j∈L\{i}, the anonymization unit 220 executes $$c_{1,j}, z_{1,j} \xleftarrow{\$} R \quad [\text{Math. 21}]$$
$$T_{1,j} \leftarrow e(I_n, {}^{z_{1,j}} y_j)^{c_{1,j}} V.$$

Step S508-3: The anonymization unit 220 executes $$T_2 \leftarrow {}^{t_2} e(I_n, g), T_2' \leftarrow {}^{t_2} e(I_n, h)$$
$$T_3 \leftarrow {}^{t_3} e(I_n, I_n) \quad [\text{Math. 22}]$$

Thus, $c_{1,j}$, $z_{1,j}$, $T_{1,j}$, $T_2$, $T_2'$, and $T_3$ are obtained.

Step S508-4: The anonymization unit 220 executes $$(c_{1,i}, c_2, c_3) \leftarrow H'(\rho, L, m, y_L, U, V, T_{1,L}, T_2, T_2', T_3) - \Sigma_{j \neq i}(c_{1,j}, 0, 0)$$
$$z_{1,i} \leftarrow t_1 - c_{1,i} \beta$$
$$z_2 \leftarrow {}^{t_2} I_n^{c_2 \beta} X$$
$$z_3 \leftarrow {}^{t_3} I_n^{c_3 \beta} r \quad [\text{Math. 23}]$$

Thus, $c_{1,i}$, $c_2$, $c_3$, $z_{1,i}$, $z_2$, and $z_3$ are obtained.

Step S509: Subsequently, the anonymization unit 220 generates a ring signature σ' such that σ'←(U, V, $c_{1,L}$, $c_2$, $c_3$, $z_{1,L}$, $z_2$, $z_3$).

Step S510: Lastly, the anonymization unit 220 outputs the ring signature σ'. Thus, the ring signature σ' is generated.

As described above, in the agent-independent agent-specified anonymizable signature scheme Σ, as in the conventional agent-specified anonymizable signature, an agent private key w is used to anonymize a signature σ. Accordingly, only an agent specified by a signer can perform anonymization of a signature σ. Accordingly, also in the agent-independent agent-specified anonymizable signature scheme Σ, even if a signature σ is leaked, anonymity of the signature σ can be ensured unless an agent private key w is leaked.

(Verification Processing)

Figure 7:
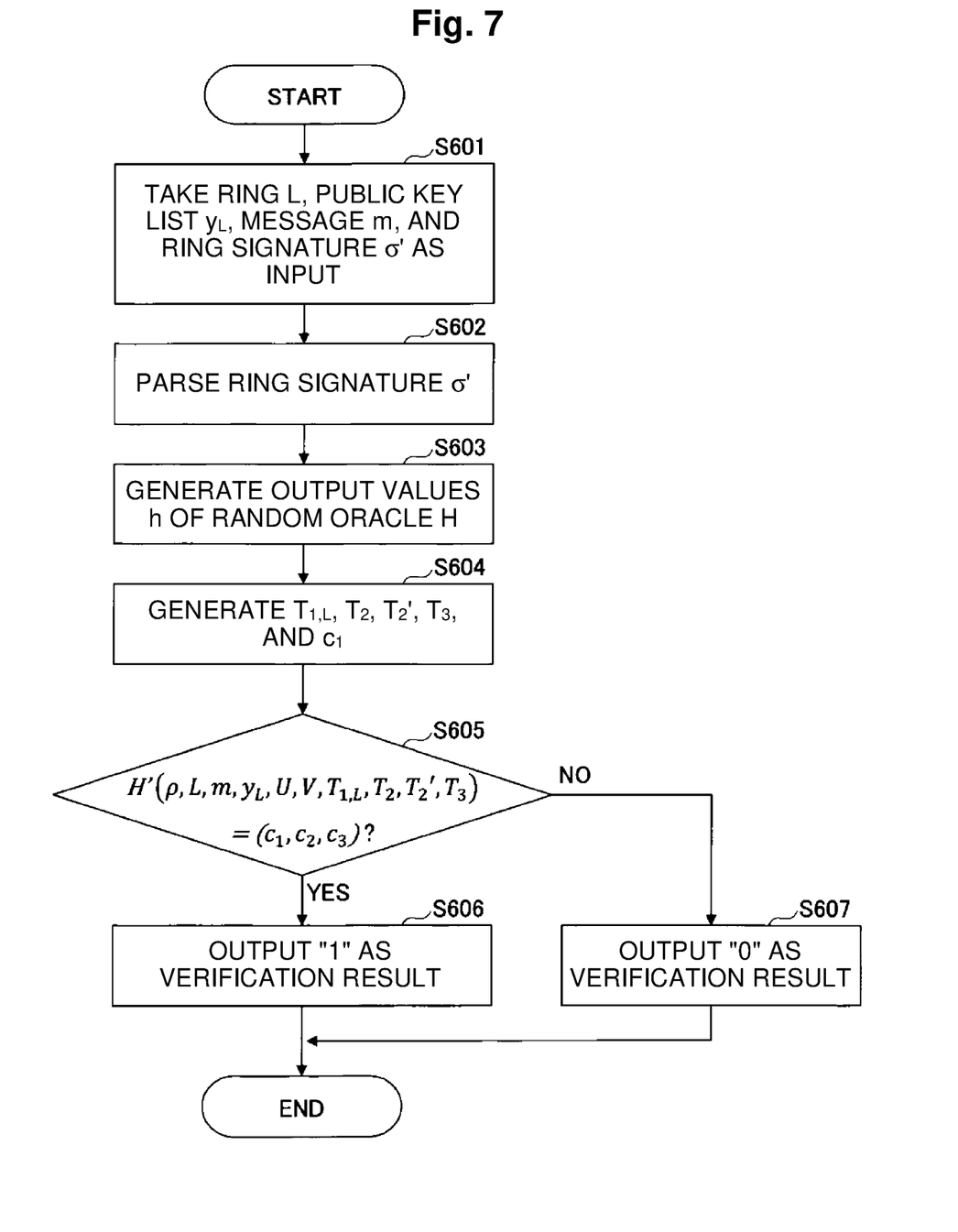
FIG. 7 is a flowchart showing an example of verification processing in the embodiment of the present invention.

Next, verification processing performed by the verification unit 310 will be described with reference to FIG. 7. FIG. 7 is a flowchart showing an example of the verification processing in the embodiment of the present invention.

Step S601: First, the verification unit 310 takes as input a ring L, a list $y_L$ of public keys of signers belonging to the ring L, a message m, and a ring signature σ'.

Step S602: Subsequently, the verification unit 310 parses the ring signature σ' such that (U, V, $c_{1,L}$, $c_2$, $c_3$, $z_{1,L}$, $z_2$, $z_3$)←σ'. In other words, the verification unit 310 analyzes the ring signature σ' into (U, V, $c_{1,L}$, $c_2$, $c_3$, $z_{1,L}$, $z_2$, $z_3$).

Step S603: Subsequently, the verification unit 310 generates output values h of a random oracle H such that h←H(ρ, m). Note that for the system parameter ρ, a system parameter ρ that is generated and made public by the system parameter generation apparatus 40 is used.

Step S604: Subsequently, with respect to any j∈L, the verification unit 310 executes $$T_{1,j} \leftarrow e(I_n, {}^{z_{1,j}} y_j)^{c_{1,j}} V$$
$$T_2 \rightarrow e(z_2, g)^{c_2} V, T_2' \leftarrow e(z_2, h)^{c_2} U$$
$$T_3 \leftarrow e(I_n, z_3)^{c_3} U$$
$$c_1 = \Sigma_{j \in L} c_{1,j} \quad [\text{Math. 24}]$$

to generate $T_{1,j}$, $T_2$, $T_2'$, $T_3$, and $c_1$.

Step S605: Subsequently, the verification unit 310 determines whether or not "H'($\rho$, L, m, $y_L$, U, V, $T_{1,L}$, $T_2$, $T_2'$, $T_3$)=($c_1$, $c_2$, $c_3$)" is satisfied.

Step S606: When it is determined in step S605 that "H'($\rho$, L, m, $y_L$, U, V, $T_{1,L}$, $T_2$, $T_2'$, $T_3$)=($c_1$, $c_2$, $c_3$)" is satisfied, the verification unit 310 outputs "1" as a verification result. In such a case, it is indicated that the message m is valid.

Step S607: When it is determined in step S605 that "H'($\rho$, L, m, $y_L$, U, V, $T_{1,L}$, $T_2$, $T_2'$, $T_3$)=($c_1$, $c_2$, $c_3$)" is not satisfied, the verification unit 310 outputs "0" as a verification result. In such a case, it is indicated that the message m is invalid.

<Hardware Configuration>

Figure 8:
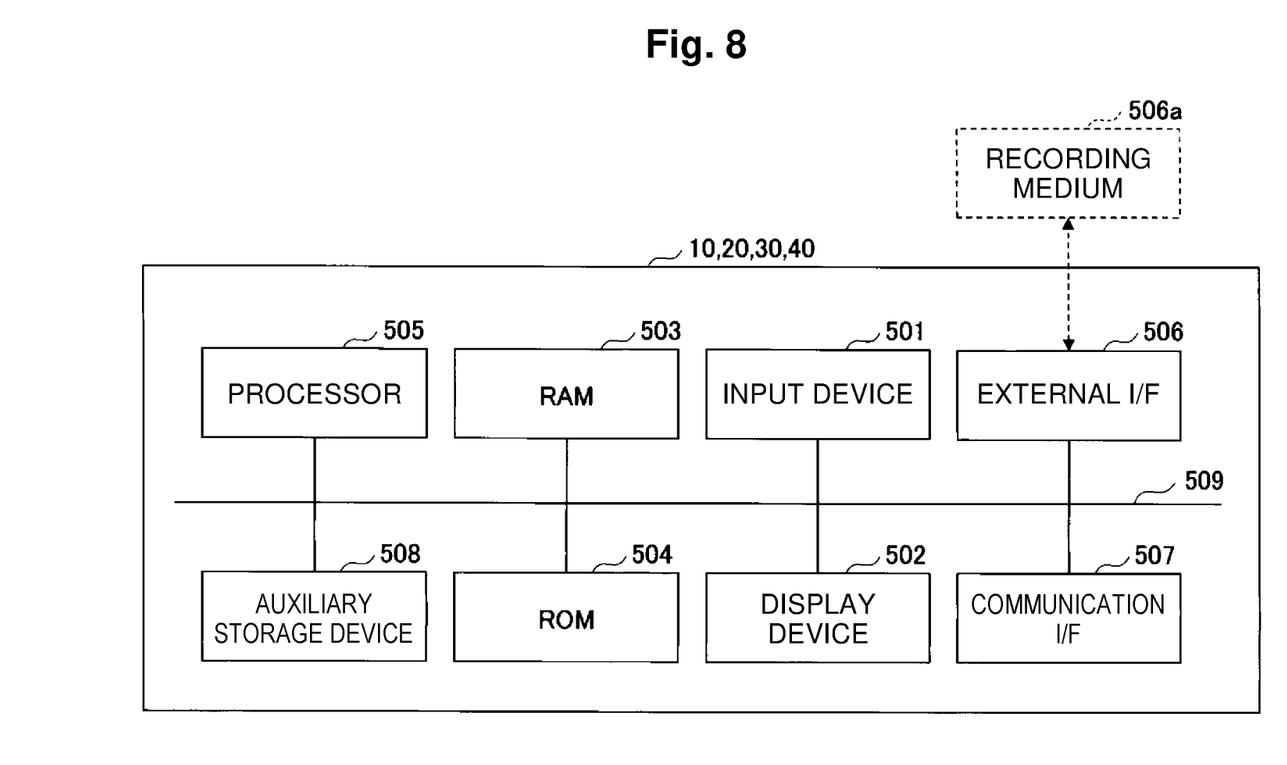
FIG. 8 shows an example of a hardware configuration of a signature generation apparatus, an anonymous signature generation apparatus, a signature verification apparatus, and a system parameter generation apparatus in the embodiment of the present invention.

Finally, a hardware configuration of the signature generation apparatuses 10, the anonymous signature generation apparatus 20, the signature verification apparatus 30, and the system parameter generation apparatus 40 in the embodiment of the present invention will be described with reference to FIG. 8. FIG. 8 shows an example of the hardware configuration of the signature generation apparatuses 10, the anonymous signature generation apparatus 20, the signature verification apparatus 30, and the system parameter generation apparatus 40 in the embodiment of the present invention. Note that since the signature generation apparatuses 10, the anonymous signature generation apparatus 20, the signature verification apparatus 30, and the system parameter generation apparatus 40 can be implemented by using almost the same hardware configuration, the hardware configuration of the signature generation apparatuses 10 will be mainly described hereinafter.

As shown in FIG. 8, each signature generation apparatus 10 in the embodiment of the present invention includes an input device 501, a display device 502, a RAM (Random Access Memory) 503, a ROM (Read Only Memory) 504, a processor 505, an external I/F 506, a communication I/F 507, and an auxiliary storage device 508. Each of the hardware pieces are communicably connected to one another through a bus 509.

The input device 501 is, for example, a keyboard, a mouse, a touch panel, or the like, and is used for a user to input various operations. The display device 502 is, for example, a display or the like, and is used to display a processing result or the like to the user. Note that the signature generation apparatuses 10, the anonymous signature generation apparatus 20, the signature verification apparatus 30, and the system parameter generation apparatus 40 may omit including at least one of the input device 501 and the display device 502.

The RAM 503 is a volatile semiconductor memory that temporarily stores a program and data. The ROM 504 is a non-volatile semiconductor memory that can retain a program and data even when a power supply is turned off. The processor 505 is, for example, a CPU (Central Processing Unit) or the like, and is a computational device that reads a program and data from the ROM 504, the auxiliary storage device 408, or the like onto the RAM 503 and performs processing.

The external I/F 506 is an interface with an external device. External devices include a recording medium 506a and the like, Examples of the recording medium 506a include a CD (Compact Disc), a DVD (Digital Versatile Disk), an SD memory card (Secure Digital memory card), a USB (Universal Serial Bus) memory card, and the like.

The communication I/F 507 is an interface for connecting the signature generation apparatus 10 to the communication network 50. The signature generation apparatus 10 can perform data communication with another device via the communication I/F 507. The same applies to the anonymous signature generation apparatus 20, the signature verification apparatus 30, and the system parameter generation apparatus 40.

The auxiliary storage device 508 is, for example, a non-volatile storage device such as an HDD (Hard Disk Drive) or an SSD (Solid State Drive). The auxiliary storage device 508 stores various data, programs (for example, one or more programs implementing the key generation unit 110 and the signature generation unit 120), and the like. Note that the auxiliary storage device 508 of the anonymous signature generation apparatus 20 stores, for example, one or more programs implementing the setup unit 210 and the anonymization unit 220, and the like. Similarly, the auxiliary storage device 508 of the signature verification apparatus 30 stores, for example, one or more programs implementing the verification unit 310, and the like. Similarly, the auxiliary storage device 508 of the system parameter generation apparatus 40 stores, for example, one or more programs implementing the system parameter generation unit 410, and the like.

The signature generation apparatuses 10, the anonymous signature generation apparatus 20, the signature verification apparatus 30, and the system parameter generation apparatus 40 in the embodiment of the present invention can implement the above-described various processing by having the hardware configuration shown in FIG. 8. Note that in FIG. 8 although the case is described in which each of the signature generation apparatuses 10, the anonymous signature generation apparatus 20, the signature verification apparatus 30, and the system parameter generation apparatus 40 is implemented by using a single apparatus (computer), not limited to such a configuration, at least one of the signature generation apparatuses 10, the anonymous signature generation apparatus 20, the signature verification apparatus 30, and the system parameter generation apparatus 40 may be implemented by using a plurality of apparatuses (computers). One apparatus (computer) may include a plurality of processors 505 or a plurality of memories (for example, RAMs 503, ROMs 504, auxiliary storage devices 508, or the like).

The present invention is not limited to the above-described embodiments specifically disclosed, and various modifications, changes, combinations, and the like can be made without departing from the scope of claims.

REFERENCE SIGNS LIST

1 Anonymous signature system
10 Signature generation apparatus
20 Anonymous signature generation apparatus
30 Signature verification apparatus
40 System parameter generation apparatus
110 Key generation unit
120 Signature generation unit
210 Setup unit
220 Anonymization unit
310 Verification unit
410 System parameter generation unit

The invention claimed is:

1. An anonymous signature system in which a signature $\sigma$ is anonymized by an agent specified by a signer, the system comprising:
one or more computers each including a memory and a processor configured to
take as input a security parameter, to generate a system parameter $\rho$ that does not depend on the agent;

take as input the system parameter ρ, to generate an agent secret key w and an agent public key $g_A$;

take as input the system parameter ρ, to generate a secret key x and a public key y of the signer;

take as input the secret key x, a message m on which the signature σ is to be put, and the agent public key $g_A$ of the agent specified by the signer, to generate the signature σ to be put on the message m;

take as input an identifier i of the signer, the agent secret key w, the signature σ, a ring L representing a group to which the signer belongs, a list $y_L$, of public keys y of signers belonging to the ring L, and the message m, to generate a ring signature σ' by anonymizing the signature σ; and take as input the ring L, the list $y_L$, the message m, and the ring signature σ', to output a verification result b for the message m.

2. The anonymous signature system according to claim 1, wherein the processor is further configured to generate a generator g of a Trapdoor DDH group by inputting a common reference character string crs generated based on the security parameter into a predetermined hash function, and to generate the system parameter p based on the generator g.

3. A system comprising:

a signature generation apparatus connected to a system parameter generation apparatus and an anonymous signature generation apparatus through a network, the system parameter generation apparatus generating a system parameter ρ that does not depend on an agent that anonymizes a signature σ though an anonymizable signature, the signature generation apparatus comprising:

a memory and a processor configured to take as input the system parameter ρ, to generate a secret key x and a public key y of a signer, wherein the system parameter ρ does not depend on the agent specified by the signer;

take as input the secret key x, a message m on which the signature σ is to be put, and an agent public key $g_A$ of the agent specified by the signer, to generate the signature σ to be put on the message m; and transmit the message m and the signature σ; and the anonymous signature generation apparatus comprising another processor configured to:

generate, based at least on an agent secret key w, the message m, and the signature σ, a ring signature σ' by anonymizing the signature σ through the anonymizable signature.

4. An anonymous signature generation apparatus connected to a system parameter generation apparatus through a network, the system parameter generation apparatus generating a system parameter ρ that does not depend on an agent that anonymizes a signature σ through anonymizable signature, the anonymous signature generation apparatus comprising:

a memory and a processor configured to take as input the system parameter ρ generated by the system parameter generation apparatus, to generate an agent secret key w and an agent public key $g_A$; and take as input the signature σ, a message m corresponding to the signature σ, an identifier i of a signer of the signature σ, the agent secret key w, a ring L representing a group to which the signer belongs, and a list $y_L$, of public keys y of signers belonging to the ring L, to generate a ring signature σ' by anonymizing the signature σ.

5. A non-transitory computer-readable recording medium having computer-readable instructions stored thereon, which when executed, cause a computer including a memory and a processor to execute respective operations in the signature generation apparatus according to claim 3, or respective operations in the anonymous signature generation apparatus according to claim 4.

* * * * *